July 24, 1951 R. K. F. BAUMLE 2,561,966
SLOTTING MECHANISM
Filed Dec. 4, 1946 3 Sheets-Sheet 3
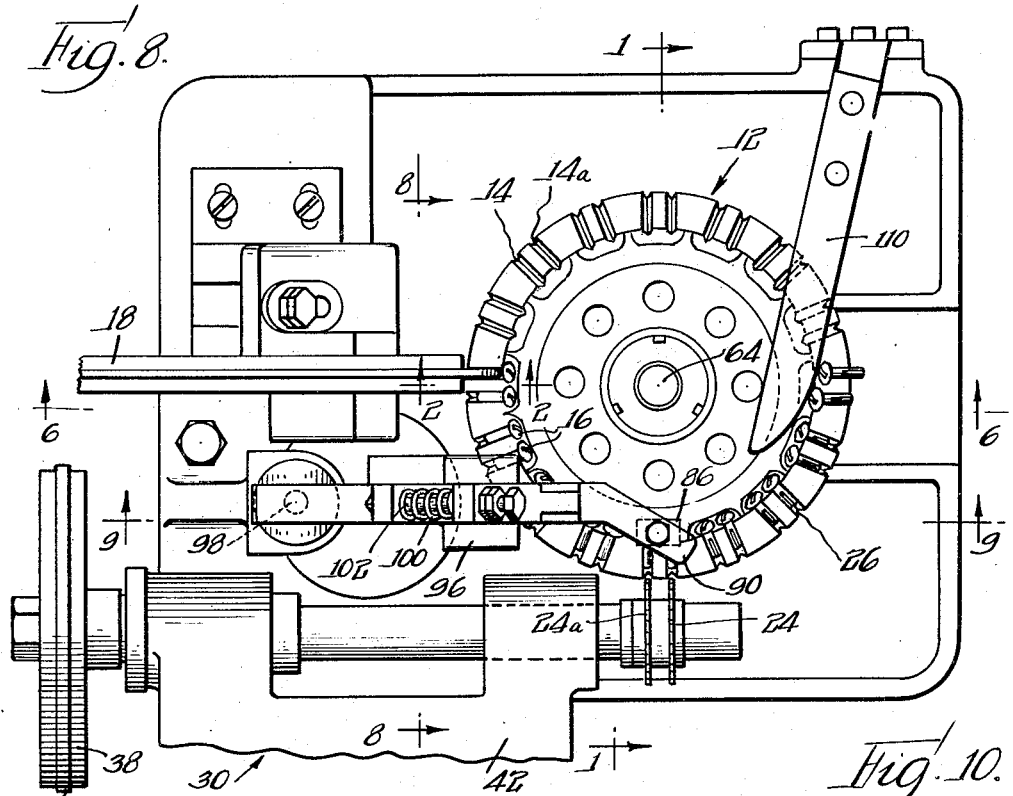
INVENTOR.
Rudolf K. F. Baumle
By: Moore, Olson & Trexler
attys.

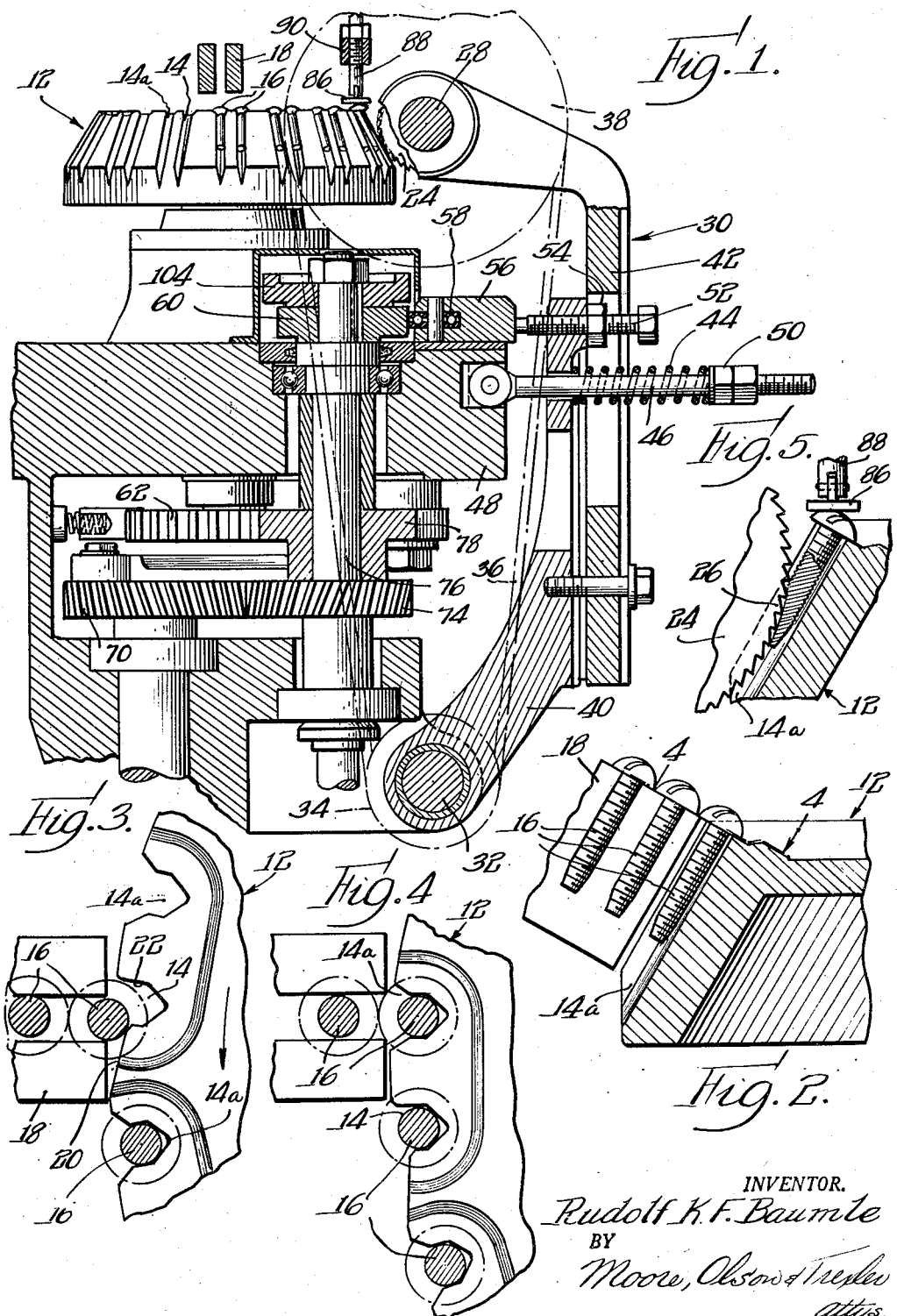
July 24, 1951     R. K. F. BAUMLE     2,561,966
SLOTTING MECHANISM
Filed Dec. 4, 1946     3 Sheets-Sheet 1
INVENTOR.
Rudolf K. F. Baumle
BY
Moore, Olson & Trexler
attys.

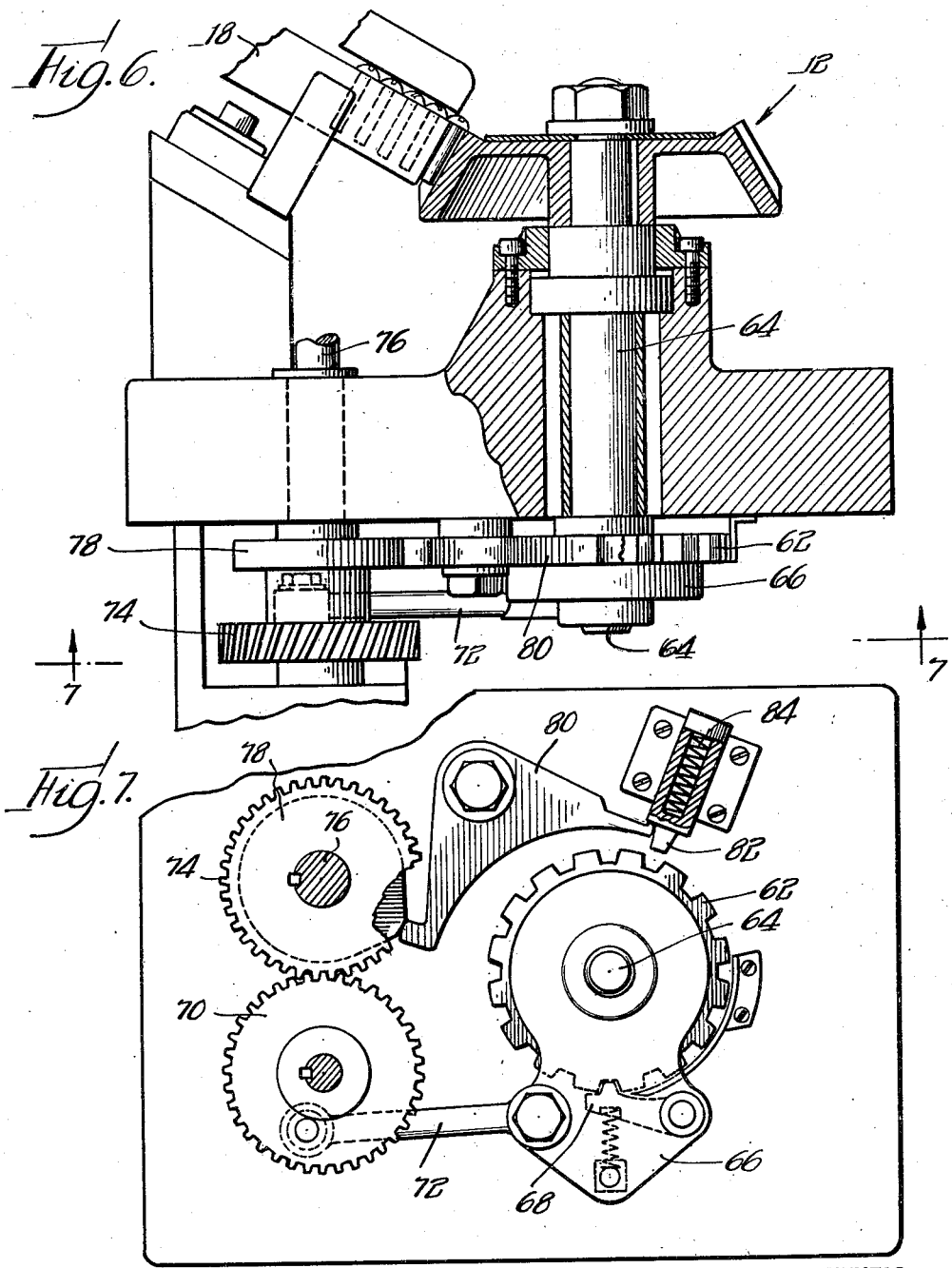

Patented July 24, 1951

2,561,966

UNITED STATES PATENT OFFICE 2,561,966

SLOTTING MECHANISM

Rudolf K. F. Baumle, Chicago, Ill., assignor to Illinois Tool Works, Chicago, Ill., a corporation of Illinois Application December 4, 1946, Serial No. 714,049

7 Claims. (Cl. 10—2)

This invention relates generally to slotting machines and more particularly to machines adapted to cut a slot in a screw member or blank.

It has been found practical, in the handling of articles such as screws to feed screw members from a feeding chute or guideway to screw accommodating recesses in a rotary feeding head or carrier. In the use of such apparatus, difficulty has been experienced in delivering the screw member from its feeding chute into proper association with the recess in the feeding head. This has been particularly noticeable in instances where more than one screw member is delivered to the rotatable feeding head during any single indexing movement of the head. Thus, it has not been uncommon for one groove in the feeding head to pass the lower end of the feeding chute without receiving a screw member from the chute. As a result, the operating efficiency of machines of the type referred to above has been materially reduced. The present invention contemplates the provision of a screw cutting machine in which the aforesaid and other difficulties heretofore experienced are completely obviated.

More specifically, the present invention contemplates a machine as set forth above wherein a group, such as a pair of screw members will be positively delivered from a feeding chute to a feeding head during a given interval of indexing movement experienced by said head.

It is a further object of the present invention to provide a slotting machine which is particularly adapted to effect the simultaneous slotting of a group of screw members during the dwell of a screw carrier such as an intermittently rotatable head.

Still more specifically, the invention contemplates a machine of the type referred to above wherein two screw members are delivered to a rotatably indexed head contemporaneously with the simultaneous slotting of two previously delivered screw members carried by said rotary head.

The foregoing and other objects and advantages will be more apparent from the following detailed description when considered in connection with the accompanying drawings wherein Figure 1 is a vertical sectional view of a slotting machine which is representative of one embodiment of the present invention, portions thereof such as the intermittently rotatable feeding head and slotting saw supports being shown in elevation for the purpose of more readily understanding the construction of the machine, said view being taken substantially along the line 1—1 of Figure 8;

Figure 2 is an enlarged fragmentary detail view taken vertically across the periphery of the rotary feeding head at the point where screw members are delivered from a chute to a recess in the head, said view being taken substantially along the line 2—2 of Figure 8;

Figure 3 is a fragmentary enlarged plan view of a portion of the feeding head in the vicinity of the lower or delivery end of the feeding chute, illustrating the manner in which the first screw element of a pair delivered during the interval of movement of the head begins to enter the screw accommodating recess in the head;

Figure 4 is a view similar to Figure 3 disclosing the position of the feeding head when it has completed one interval of movement so as to accommodate a pair of screw members subsequently to be slotted. This view is taken substantially along the line 4—4 of Figure 2;

Figure 5 is a detail vertical section to illustrate the manner in which the slotting saws function to produce a slot in the screw;

Figure 6 is a vertical sectional view shown partly in elevation taken substantially along the line 6—6 of Figure 8;

Figure 7 is a horizontal sectional view taken substantially along the line 7—7 of Figure 6 to more clearly illustrate the mechanism for imparting intermittent movement to the feeding head;

Figure 8 is a plan view of the mechanism as shown in Figure 6;

Figure 9 is a vertical sectional view taken substantially along the line 9—9 of Figure 8; and Figure 10 is an elevational view of a screw member in which a slot has been cut by the machine referred to above.

Referring now to the drawings more in detail wherein like numerals have been employed to designate similar parts throughout the various views, it will be seen that one embodiment of the invention contemplates an intermittently rotatable screw accommodating head designated generally by the numeral 12. The head 12 is adapted to be intermittently rotated about a vertical axis. The head is of frusto-conical form, and along its conical side surface is provided with pairs of screw accommodating recesses, the advancing recesses of each pair or group being designated by the numeral 14 and the second recesses by the numeral 14a. Screw elements 16 are adapted to be delivered to the recesses 14—14a along a suitable inclined chute 18. The manner in which the screw members 16 are received by the recesses 14—14a is best illustrated in Figures 2 to 4, inclusive. Figure 2 illustrates the manner in which the screw elements slide downwardly along the chute 18 toward the recesses in the head 12. Figure 3 illustrates the initial indexing movement of the head 12, and in this connection, particular attention is directed to the cutaway or relieved area 20 in advance of the recess 14. By having this relieved portion 20, the lowermost screw member 16 begins to move inwardly toward the axis of the head 12 contemporaneously with the initial advancing movement of the head. When the head reaches the position illustrated in Figure 3, the lowermost screw member 16 is well on its way toward the advancing recess 14 so that as soon as the mouth of the recesses 14 registers with the lower extremity of the chute 18, the screw member is positively directed into the recess and is urged forwardly by the substantial abutment surface 22. The head continues to move until it reaches the position illustrated in Figure 4 where the trailing recess 14a comes to rest in registration with the lower end of the chute slot.

By having the structural arrangement just described, difficulties heretofore experienced in delivering screw members to an indexible head are completely obviated. That is to say, the present invention provides a rotary head arrangement which positively assures the delivery of a pair of screw members thereto during each interval of indexing movement. This is particularly important in the use of machines of the type described herein having a pair of reciprocable slotters about to be described.

Assume that the feeding head 12 has been indexed through 90° so as to bring the pair of screw members delivered from the chute 18 into position opposite a pair of rotary slotters 24—24a. During the dwell of the feeding head 12 in this position, these slotters 24—24a are shifted forwardly so as to cut a groove or slot 26 in the screw members in the manner illustrated in Figure 5. These slotters 24—24a are rotatably supported upon a suitable drive shaft 28 carried in a tiltable or rocking frame 30. The frame 30 is pivotally supported by a shaft 32. This shaft also carries a pulley 34 which is connected by a belt or chain 36 with a pulley or sheave 38, said parts being shown by dot and dash lines in Figure 1. It will also be noted that the oscillatory frame 30 is preferably made up of two parts, namely a lower section 40 and an upper section 42, adjustably secured to the lower section. The upper section 42 is adapted to be vertically adjusted with respect to the lower section 40. The slotters 24—24a are constantly urged toward the work, namely to the left (Figure 1) by a coiled spring 44 which encircles a rod 46. The left extremity of the rod 46 is pivotally secured to a frame 48, the spring 44 being interposed between the frame section 40 and abutment nuts 50 carried by the outer threaded end of the rod 46. In this manner, the spring 44 normally urges the frame 30 to the left (Figure 1). The frame section 40 carries an abutment screw member 52, secured in adjusted position by a lock nut 54. The inner end of the screw 52 engages a cam actuated slide block 56. This slide block 56 carries an anti-friction bearing or follower member 58 which frictionally coacts with the periphery of a rotary cam 60. During each complete rotation of the cam 60, the frame 30 experiences one complete oscillation. This period of oscillation is obviously timed with the intermittent movement of the head 12.

Intermittent rotary movement of the head 12 is caused by a mechanism illustrated in detail in Figure 7. This mechanism consists of a ratchet wheel 62 keyed to a vertical shaft 64. The upper extremity of this shaft 64 carries the feeding head or carrier 12, as clearly shown in Figure 6. Keyed to the shaft 64 is an oscillatory plate 66 which carries a spring pressed pawl 68. The plate 66 is connected with a driving gear 70 through the agency of a link, or connecting rod 72. During half of the rotation of the gear 70, the pawl supporting plate 66 is swung to the left (Figure 7) during which time it imparts an interval of movement to the feeding head 12, and during the other half of the rotation of the gear 70, the pawl 68 shifts to the right, in a counter-clockwise direction as viewed in Figure 7, so as to be conditioned for subsequent actuating engagement with the ratchet 62. A second gear 74 on a shaft 76 meshes with the gear 70 and imparts rotation to a cam 78 keyed to the shaft 76. With the high point of the cam 78 engaging one arm of a bell crank 80, as illustrated in Figure 7, the opposite arm of the bell crank holds a positioning pin 82 disengaged with respect to the ratchet 62. During this period of disengagement, the pawl 68 imparts indexing movement to the ratchet. During the remainder of the stroke of the pawl 68, the pin 82 through the action of a spring 84 is held in interlocking association with the ratchet 62 so as to prevent movement of the feeding head 12. It is during this period of dwell that the cutting action of the slotting tools 24—24a takes place.

In order to secure the screws in a fixed position during the slotting operation, a screw clamping member 86 is provided, said clamping member being pivotally supported at the lower end of a screw member 88 carried by a lever 90. This lever 90 is pivotally supported at 92 by a second lever 94. The lever 94 is pivotally supported intermediate its ends by a bracket 96, and the opposite end of the lever arm 94 superimposes a vertically shiftable actuating pin 98. As the actuating pin 98 moves upwardly, it tilts the lever arm 94 in a clockwise direction as viewed in Figure 9, and this causes the member 86 carried by the arm 90 to be moved into clamping engagement with a pair of screw members 16—16a previously delivered to the feeding head 12 from the chute 18. The pivotal mounting for the member 86 is such as to render said member self-adjustable to any variation in the heights of the complementary pairs of screw heads.

In order to effect resilient clamping engagement of the member 86 with the heads of the screws 16—16a, a coil spring 100 encircling a screw 102 is interposed between the upper free extremity of the lever 90, and an upwardly projecting portion formed integral with the lever arm 94. Thus, after the clamping member 86 has been shifted into clamping engagement with the heads of a pair of screws, further continued clockwise movement of the lever arm 94 causes the spring 100 to be compressed, thereby resiliently urging the lever 90 in a clockwise direction so as to effect firm and resilient engagement of the member 86 with the screw heads.

The timed functioning of the screw clamping mechanism just described is occasioned by a rotary cam 104. The upper surface of the cam 104 coacts with a follower roller 106 carried at the lower end of an actuating plunger 108, the upper end of which carries the actuating pin 98 previously referred to. The cam 104 is carried by the shaft 76 immediately above the rotary cam 60 which actuates the slotter supporting frame 30. This shaft 76 may be coupled with any suitable source of power supply such as an electric motor, not shown. The actuating surface of the cam 104 is so arranged that the clamping engagement of the member 86 with a pair of screw members positioned opposite the slotters 24—24a takes place the instant that the feeding head 12 begins its period of dwell and the slotters move into operative association with the screw members 14—14a.

From the foregoing, it will be apparent that the feeding head 12, the slotters 24—24a, and the clamping member 86 through the various gear and cam devices just described, operate in timed relation so as to effect rapid successive slotting of pairs of screw members in a very efficient manner. The coacting parts are of extremely simple construction and are relatively few in number. As previously pointed out, the rotary screw feeding head is so constructed as to insure the delivery of two screw members from the chute during each interval of indexing movement experienced by the feeding head. By employing a rotary type feeding head to accommodate screw members in pairs, the ease with which such pairs of screws may be positioned in rapid succession in operative association with the slotters is greatly facilitated. Also, by having the tilting or oscillatory slotter supporting frame for shifting the slotters toward and away from screw members carried by the rotary feeding head, the speed and accuracy with which the slotting operation takes place is enhanced. It will also be apparent that after the screws have been slotted, they are automatically ejected from the feeding head by a stripping arm 110. Upon engagement with the arm 110, the screws are stripped or ejected from the feeding head and directed to a suitable receptacle, not shown. Obviously, the invention is not limited to the slotting of screw shanks, but is capable of being used in any instance where pairs of elements such as screw members are to be received from a delivery device such as a chute, and subsequently moved into position to be slotted. It will also be apparent that for the purpose of illustrating one practical embodiment of the invention, certain structural features of design have been disclosed herein, and the invention is by no means limited to these specific structural features, but is capable of other modifications and changes without departing from the spirit and scope of the appended claims.

I claim:

1. Automatic screw cutting apparatus including an inclined guideway for feeding screw elements, an intermittently rotatable screw advancing carrier having a peripheral surface extending substantially normal and adjacent to the lower extremity of said guideway, said peripheral surface having in association therewith transversely extending screw receiving recesses arranged in groups, the leading side of at least one recess in each group opening into a peripherally relieved section to facilitate direction of a screw element from the guideway into said advance recess as the carrier moves, the leading edge of at least one recess in each group lying equidistant with the trailing edge thereof from the center of said carrier to facilitate reception of a screw element when the carrier is stationary, a plurality of rotary cutters corresponding in number to the number of screw elements in each of said groups, means for rotating said carrier intermittently to move said groups of screw elements successively into position to be acted upon by said cutters, and means for causing relative approaching movement between said carrier and cutters for effecting screw cutting action of a group of screw elements between intermittent movements of said carrier.

2. In a machine for slotting headed screw elements, a rotatable drum having in its periphery a plurality of groups of outwardly opening recesses to receive the shanks of screw elements, the recesses of each group being substantially parallel to one another said drum having screw element head supporting surfaces normal to said recesses to receive and support the heads of screw elements received in said recesses, an inclined guideway for feeding screw elements to said drum with their shanks aligned for passage into said recesses and the heads aligned for reception on the head supporting surfaces of the drum, a group of rotary slotters shiftably mounted for movement generally radially of said drum in angular spaced relation to said guideway and into engagement with the screw elements in a group of said recesses to slot the shanks of said screw elements, and means for rotating and shifting said slotter.

3. In a machine for slotting headed screws as set forth in claim 2, means for clamping the heads of a group of screw elements against the head supporting surfaces of the drum during the shank slotting operation on that group.

4. In a screw slotting machine, a guideway for feeding screw elements, an intermittently rotatable drum having in its periphery a plurality of groups of outwardly opening recesses to receive groups of screw elements successively from said guideway, the leading side of the advance recess of each group being of less depth than the trailing edge of said recess and opening into an arcuately extending, radially relieved peripheral surface portion to cause the advance recess of each group to pick up a screw from the guideway during movement of the drum, means for intermittently rotating the drum angular distances corresponding to the arcuate spacing between the trailing recesses of successive groups of recesses to successively register the trailing recesses with the guideway to receive a screw element from the guideway while the drum is at rest, a plurality of rotary slotters corresponding in number to the number of peripheral recesses in each of said groups, said rotary cutters being shiftably mounted for simultaneous movement generally radially of said drum into simultaneous engagement with the screw elements in said group of recesses simultaneously to slot a group of screw elements, and means for rotating said slotters and shifting said slotters simultaneously.

5. In a screw slotting machine as set forth in claim 4, shiftably mounted means for clamping the screw elements to the drum during the slotting operation, and means for operating said clamping means in timed relation to the shifting of said slotters.

6. In a screw slotting machine, a frusto-conical drum having a smaller diameter at its upper end than at its lower end and being mounted for rotation about a substantially vertical axis, said drum having a plurality of outwardly opening recesses in its conical surface and screw head supporting surface portions normal to said recesses, a screw feeding guideway inclined substantially normal to said conical surface for feeding the screw elements successively into said recesses with the shanks aligned with the recesses and the head thereof aligned with the head supporting surface portions of the drum, the screw elements thereby lying at a substantialy constant angle relative to the vertical axis of the drum and being maintained in said recesses by gravity a shank slotter mounted for rotation about an axis normal to the axis of rotation of the drum and shiftably mounted for movement substantially radially of the drum into engagement with the shanks of the screw elements in the recesses of the conical surface of the drum, and means operable in timed relation to the shifting of the slotter for engaging and clamping the heads of the screw elements against the head supporting surface portions of the drum during the slotting operation.

7. A screw element carrier including an intermittently rotatable drum having in its periphery a plurality of groups of outwardly opening recesses to receive groups of screw elements, the leading side of at least one recess of each group being of less depth than the trailing edge of that recess and opening into an arcuately extending radially relieved peripheral surface portion to facilitate reception of a screw by that recess during movement of the drum, the leading side of at least one other recess of that group being of equal depth with the trailing edge of that recess to facilitate reception of a screw while the drum is stationary, and means of intermittently rotating the drum angular distances corresponding to the arcuate spacing between like recesses of successive groups.

RUDOLF K. F. BAUMLE.

REFERENCES CITED

The following references are of record in the file of this patent:

UNITED STATES PATENTS

| Number | Name | Date |
| --- | --- | --- |
| 15,052 | Whipple | June 3, 1856 |
| 661,642 | Hommel | Nov. 13, 1900 |
| 1,553,885 | Watrous | Sept. 15, 1925 |
| 1,584,263 | Wilcox | May 11, 1926 |
| 1,594,821 | Dulligan | Aug. 3, 1926 |
| 1,629,705 | Holmberg | May 24, 1927 |
| 1,793,646 | Stimpson | Feb. 24, 1931 |
| 1,921,403 | Bell | Aug. 8, 1933 |
| 1,938,939 | Smith | Dec. 12, 1933 |
| 2,418,070 | Green | Mar. 25, 1947 |